US011062520B2

(12) United States Patent
Smets

(10) Patent No.: US 11,062,520 B2
(45) Date of Patent: Jul. 13, 2021

(54) ERGONOMIC ASSESSMENT USING A WEARABLE DEVICE

(71) Applicant: Ford Global Technologies, LLC, Dearborn, MI (US)

(72) Inventor: Martin Smets, LaSalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/564,755

(22) Filed: Sep. 9, 2019

(65) Prior Publication Data

US 2021/0074063 A1   Mar. 11, 2021

(51) Int. Cl.
| | |
|---|---|
| *G06T 19/00* | (2011.01) |
| *G02B 27/01* | (2006.01) |
| *G06T 17/20* | (2006.01) |
| *G06T 19/20* | (2011.01) |
| *G01S 15/08* | (2006.01) |
| *G01S 13/08* | (2006.01) |
| *G01S 17/08* | (2006.01) |

(52) U.S. Cl.
CPC .......... *G06T 19/006* (2013.01); *G02B 27/017* (2013.01); *G06T 17/20* (2013.01); *G06T 19/20* (2013.01); *G01S 13/08* (2013.01); *G01S 15/08* (2013.01); *G01S 17/08* (2013.01); *G02B 2027/014* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 5,988,862 A | * | 11/1999 | Kacyra | G01B 11/002 382/195 |
| 9,135,392 B2 | | 9/2015 | Raschke et al. | |
| 2009/0157478 A1 | * | 6/2009 | Yang | G06Q 30/02 705/7.29 |
| 2009/0244071 A1 | * | 10/2009 | Kuo | G06T 13/40 345/473 |

(Continued)

FOREIGN PATENT DOCUMENTS

JP     6273141 B2     1/2018

OTHER PUBLICATIONS

Mahdavian et al., "Digital human modelling in a virtual environment of CAD parts and a point cloud", 2017 (Year: 2017).*

(Continued)

*Primary Examiner* — Phong X Nguyen
(74) *Attorney, Agent, or Firm* — Brandon Hicks; Bejin Bieneman PLC

(57) ABSTRACT

A wearable device is disclosed that may comprise: a display that permits a user to view a real-world (RW) environment; and a computer in communication with the display, the computer comprising one or more processors and memory storing instructions, executable by the one or more processors, the instructions comprising, to: using sensor data, determine a virtual surface model (VSM) associated with a real-world (RW) object in the RW environment; and provide, via the display, a three-dimensional (3D) digital human model (DHM) located within the RW environment, wherein the DHM and the VSM are restricted from occupying a common three-dimensional space.

20 Claims, 6 Drawing Sheets

(56) References Cited

U.S. PATENT DOCUMENTS

| | | | | |
|---|---|---|---|---|
| 2010/0030532 | A1* | 2/2010 | Arora | G06T 13/40 |
| | | | | 703/2 |
| 2010/0198563 | A1* | 8/2010 | Plewe | G06F 30/392 |
| | | | | 703/1 |
| 2013/0197887 | A1* | 8/2013 | Raschke | G06F 30/17 |
| | | | | 703/6 |
| 2013/0286004 | A1* | 10/2013 | McCulloch | G06T 19/006 |
| | | | | 345/419 |
| 2015/0302168 | A1* | 10/2015 | De Sapio | G16H 50/50 |
| | | | | 703/11 |
| 2017/0061043 | A1* | 3/2017 | Lemieux | G06T 13/40 |
| 2017/0169138 | A1* | 6/2017 | Lemieux | G16H 20/30 |
| 2018/0244285 | A1* | 8/2018 | Stevens | B60N 2/0248 |
| 2018/0330551 | A1* | 11/2018 | Andersson | G06T 15/00 |
| 2019/0102946 | A1 | 4/2019 | Spivack et al. | |
| 2019/0290202 | A1* | 9/2019 | Di Pardo | A61B 5/4561 |

OTHER PUBLICATIONS

Chander et al., "Multi-directional one-handed strength assessments using AnyBody Modeling Systems", 2018 (Year: 2018).*

Michael Rizzuto, et. al., "Evaluation of a Virtual Reality Head Mounted Display as a Tool for Poture Assessment in Digital Human Modelling Software", (Abstract Only), Applied Ergonomics, vol. 79, Sep. 2019, retrieved from https://doi.org/10.1016/j.apergo.2019.04.001 (2 pages).

* cited by examiner

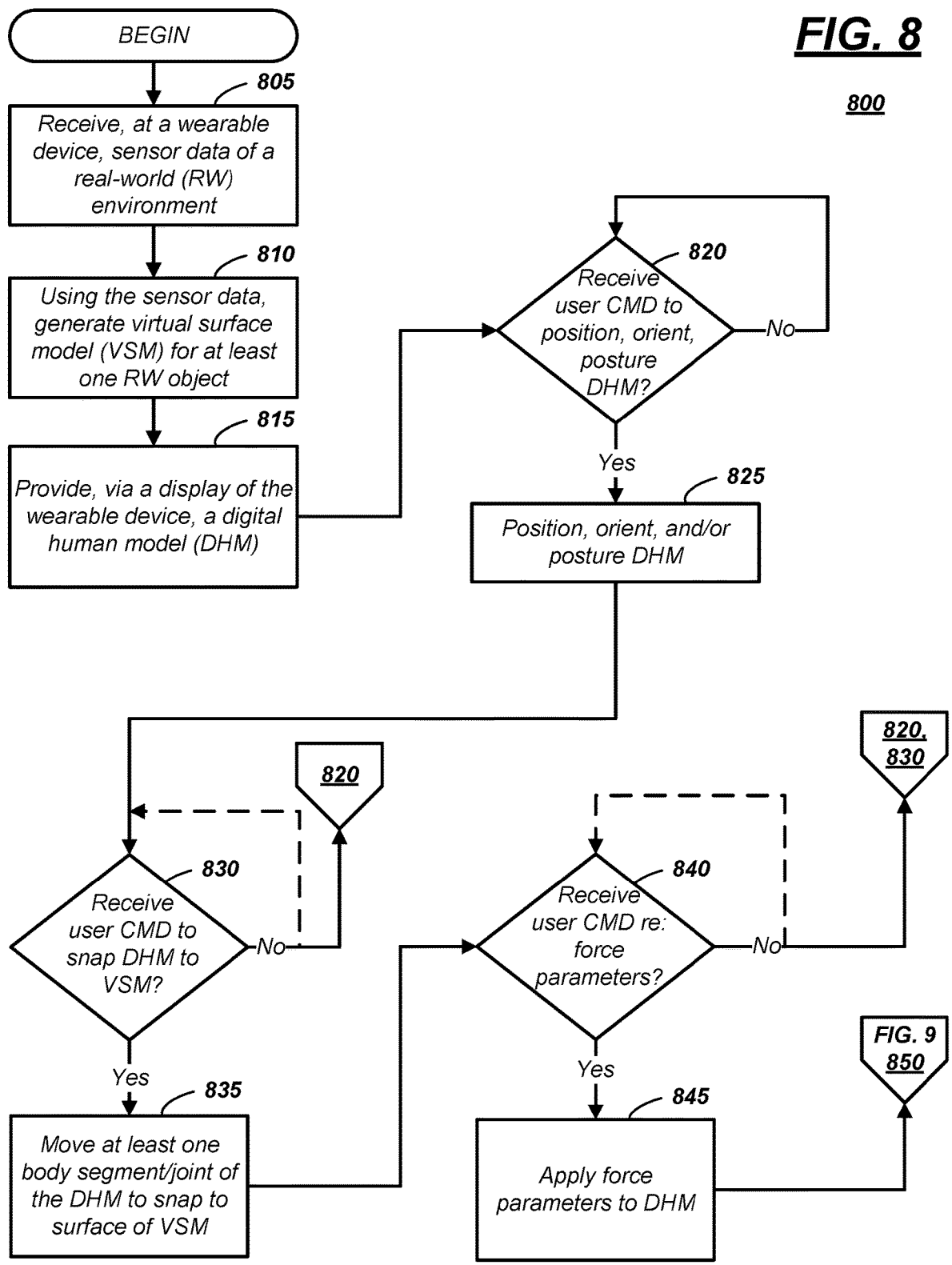

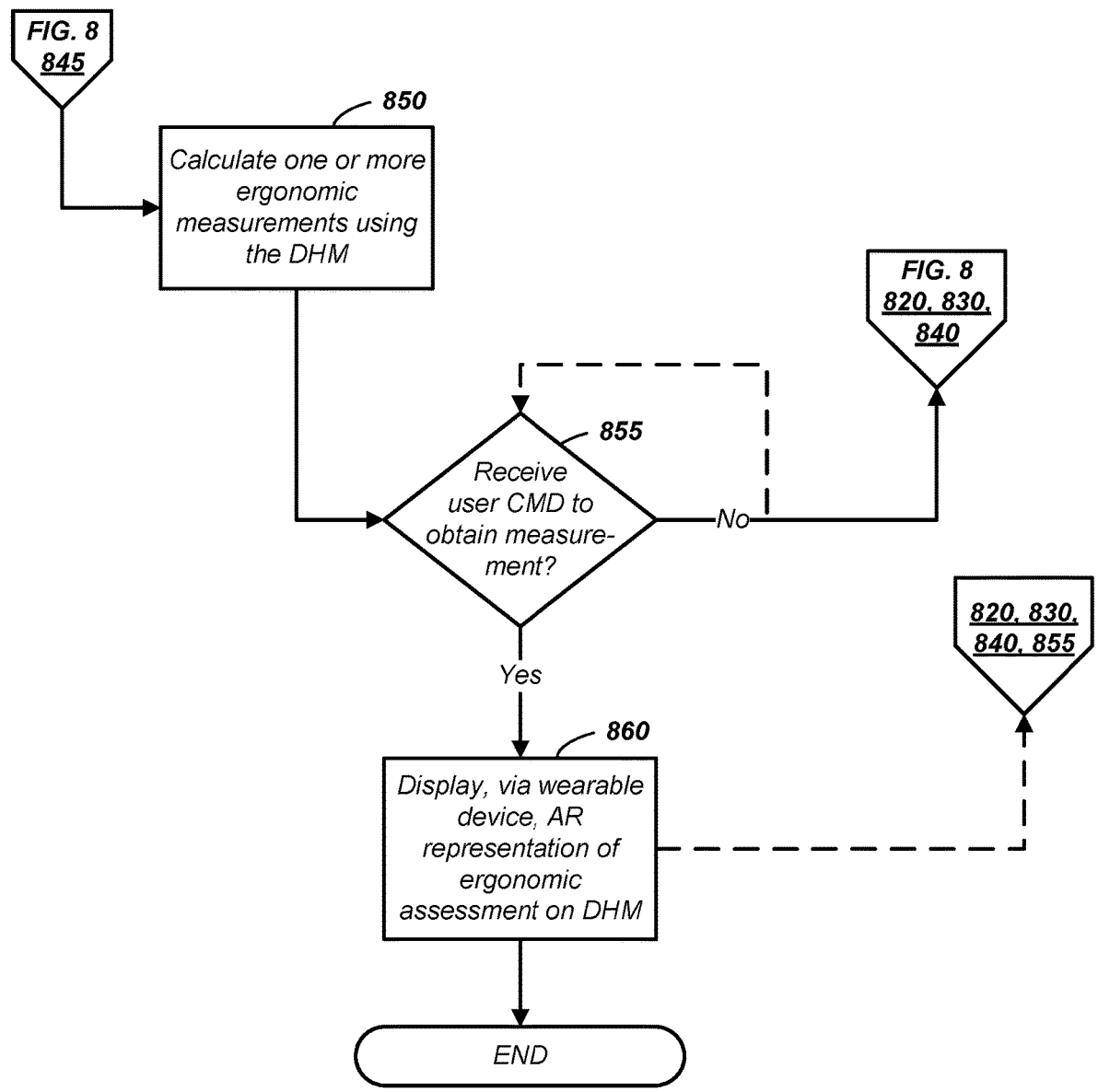

ERGONOMIC ASSESSMENT USING A WEARABLE DEVICE

BACKGROUND

Ergonomics engineering pertains to a science of a collection of data and principles about human characteristics, capabilities, and limitations in relation to machines, jobs, and environments. There is a need to provide ergonomists a tool for collecting human data.

BRIEF DESCRIPTION OF THE DRAWINGS

FIGS. 8-9 are a flow diagram illustrating a process of determining an ergonomic assessment using at least the primary wearable device.

DETAILED DESCRIPTION

Figure 1:
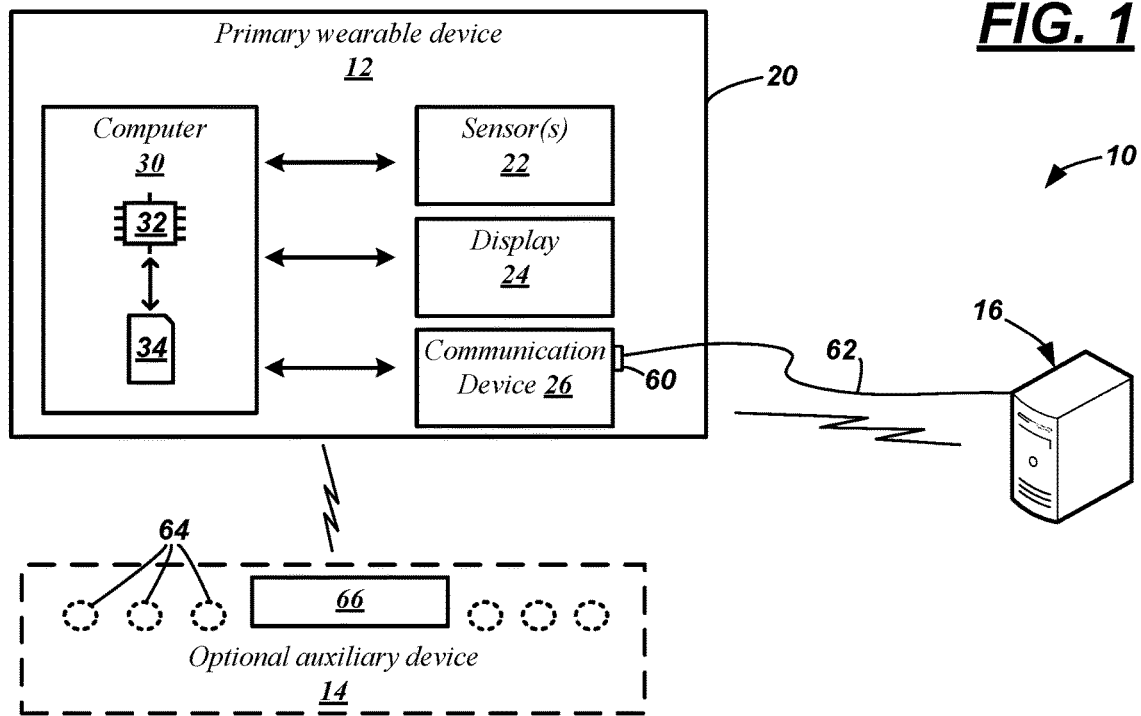
FIG. 1 is a schematic diagram of an ergonomic assessment system that comprises a primary wearable device and an optional auxiliary wearable device which may be used to assess ergonomic data.

An ergonomic system is described in detail below that includes a wearable device. The wearable device may comprise: a display that permits a user to view a real-world (RW) environment; and a computer in communication with the display, the computer comprising one or more processors and memory storing instructions, executable by the one or more processors, the instructions comprising, to: using sensor data, determine a virtual surface model (VSM) associated with a real-world (RW) object in the RW environment; and provide, via the display, a three-dimensional (3D) digital human model (DHM) located within the RW environment, wherein the DHM and the VSM are restricted from occupying a common three-dimensional space; and move the DHM relative to the VSM, wherein the DHM and the VSM are restricted from occupying a common three-dimensional space.

According to the at least one example set forth above, the instructions further comprise, to: generate a virtual mesh using the sensor data; and determine the VSM based on the virtual mesh.

According to the at least one example set forth above, the instructions further comprise, to: the instructions further comprise, to: determine a virtual mesh using the sensor data; and restrict an exterior surface of the DHM from occupying a space defined by the RW object.

According to the at least one example set forth above, the sensor data comprises point cloud data, wherein the VSM is determined using the point cloud data.

According to the at least one example set forth above, the instructions further comprise, to: based on a user command, position, orient, or posture at least one body segment or at least one body joint of the DHM.

According to the at least one example set forth above, the instructions further comprise, to: snap the DHM to the VSM.

According to the at least one example set forth above, snapping includes connecting at least a portion of an exterior surface of the DHM to the VSM.

According to the at least one example set forth above, the instructions further comprise, to: snap the DHM to the VSM; receive, based on user input, a plurality of force parameters of the DHM that are associated with the VSM; and calculate an ergonomic measurement based on the force parameters.

According to the at least one example set forth above, the force parameters comprise: a force magnitude, a force direction, and a force location.

According to the at least one example set forth above, the instructions further comprise, to: provide, via the display, one or more ergonomic measurements of the DHM.

According to the at least one example set forth above, the wearable device further comprises: at least one sensor that receives the sensor data; and a wearable structure that supports the at least one sensor, the display, and the computer.

According to at least one additional illustrative example, a method, comprises: using sensor data, determining a virtual surface model (VSM) associated with a real-world (RW) object in a real-world (RW) environment; and providing, via a display of the wearable device, a three-dimensional (3D) digital human model (DHM) located within the RW environment, wherein the display permits a user to view the RW environment and the DHM concurrently, wherein the DHM and the VSM are restricted from occupying a common three-dimensional space.

According to the at least one example set forth above, the method further comprises: generating a virtual mesh using the sensor data; and determine the VSM based on the virtual mesh.

According to the at least one example set forth above, the method further comprises: determining a virtual mesh using the sensor data; and restricting an exterior surface of the DHM from occupying a space defined by the RW object.

According to the at least one example set forth above, the sensor data comprises point cloud data, wherein the VSM is determined using the point cloud data.

According to the at least one example set forth above, the method further comprises: based on a user command, positioning, orienting, or posturing at least one body segment or at least one body joint of the DHM.

According to the at least one example set forth above, the method further comprises: snapping the DHM to the VSM, wherein snapping includes connecting at least a portion of an exterior surface of the DHM to the VSM.

According to the at least one example set forth above, the method further comprises: snapping the DHM to the VSM; receiving, based on user input, a plurality of force parameters of the DHM that are associated with the VSM; and calculating an ergonomic measurement based on the force parameters.

According to the at least one example set forth above, the method further comprises: providing, via the display, one or more ergonomic measurements of the DHM.

According to the at least one example set forth above, wherein wearable device further comprises: at least one sensor that receives the sensor data; a computer; and a wearable structure that supports the at least one sensor, the display, and the computer.

According to the at least one example set forth above, a computing device comprising a processor and memory is disclosed that is programmed to execute any combination of the examples of the method(s) set forth above.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors of the wearable device, as set forth above and herein.

Turning now to the figures, wherein like reference numerals indicate like or similar features and/or functions, an example of an ergonomic assessment system 10 is shown. In FIG. 1, the system 10 comprises a primary wearable device 12 (hereafter, for sake of brevity, referred to as the 'wearable device'), an optional auxiliary device 14 which also may be wearable and which may interact with wearable device 12, and a remote computer 16 which, in some examples, may receive ergonomic data from wearable device 12. Wearable device 12 may be worn by a user (e.g., an ergonomist and on the ergonomist's face or head) so that when the user looks through the wearable device 12, he/she sees both the real-world (RW) around her/him, as well as one or more virtual (or computer-generated) objects—namely, an augmented reality (AR) user experience (UE). As will be described in greater detail below, the virtual objects include one or more virtual surface models (VSMs) defined by the shape and size of one or more RW objects (visible within the point-of-view of the user), as well as a digital human model (DHM). The DHM, as explained more below, is a digital mannequin (e.g., a three-dimensional (3D) hologram defined by an exterior surface thereof) whose body segments and body joints may be mimic those of a human (e.g., mimicking a human of any suitable percentile male or any suitable percentile female with respect to size, weight, strength, range of motion, speed, position, posture, or the like). Using the wearable device 12, the user can cause the DHM to grasp and/or otherwise contact VSMs and then attempt to lift, move, or otherwise interact with the VSMs. Since the wearable device 12 can store characteristics of the VSM (or more particularly, to a size or shape of the corresponding RW object), the wearable device 12 can be used to assess biomechanical forces placed on the joints of the DHM when the DHM interacts with the VSM. Further, the wearable device 12 may display these loads (e.g., overlaying digital information regarding the DHM using AR techniques) so that the user may make a real-time ergonomic assessment. An example process of using the wearable device 12 will be explained following a description of the example system 10.

According to a non-limiting example, wearable device 12 may comprise a wearable structure 20 that supports one or more sensors 22, a display 24, a wired and/or wireless communication device 26, and a computer 30 (comprising one or more processors 32 and memory 34), wherein the computer 30 communicates with and/or controls sensor(s) 22, display 24, and communication device 26. Each will be discussed in turn.

According to the illustrated example (see FIGS. 2-3), wearable structure 20 comprises a frame front 40 and two temples 42, 44 which are pivotably connected to the frame front 40 and which each may have a temple tip (46, 48) at a respective end of the temples (42, 44). Furthermore, the frame front 40 may be coupled to the display 24. The wearable structure 20 may be sized to a human head so that, when worn on the face, the frame front 40 is located at the user's nasal bridge, the display 24 is positioned in front of the user's eyes, and the temple tips are 46, 48 respectively are behind the user's ears.

Figure 2:
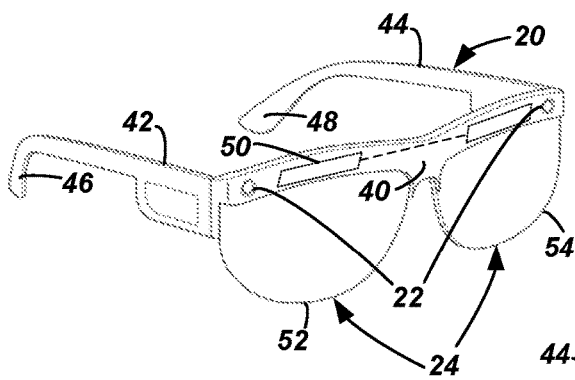
FIGS. 2-3 are perspective diagrams illustrating a non-limiting example of the primary wearable device of FIG. 1.
Figure 3:
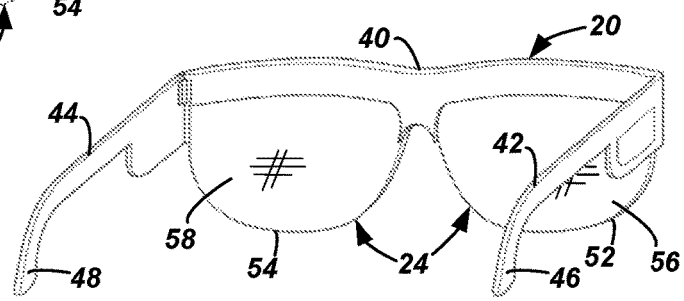

Sensor(s) 22 may be any suitable electronics used to gather sensor data regarding the surroundings of the user. In FIG. 2—by way of example only—two sensors 22 are shown coupled to the front frame 40 facing outwardly. For example, with respect to an orientation of a user wearing the wearable device 12, outwardly corresponds with a user-forwardly direction. Of course, other quantities of sensors 22 may be used instead. Sensor data may include shape, color, and/or depth information regarding real-world (RW) objects around the user who is wearing the wearable device 12. The term RW object refers to physical objects—those having mass and occupying space. Non-limiting examples of sensor(s) 22 include one or more of: a camera sensor, a light detection and ranging (LIDAR) sensor, a millimeter (mm) radio detection and ranging (RADAR) sensor, a sound navigation and ranging (SONAR) sensor (e.g., an ultrasonic sensor), or the like.

In at least one example of wearable device 12, sensor(s) 22 include at least one depth-detection sensor (e.g., at least one LIDAR sensor, mm-RADAR sensor, SONAR sensor, or the like). For instance, when at least one sensor 22 of wearable device 12 is a LIDAR sensor, in operation, the LIDAR sensor may generate a plurality of depth measurements—collectively, referred to as a point cloud. As described more below, at least a portion of the point cloud may be used to generate a virtual mesh and one or more virtual surface models (VSMs). When other depth-detection sensors are used, they similarly may determine a plurality of depth measurements using their respective technologies.

As discussed above, display 24 may be any electro-mechanical device which permits the user to see reality (RW objects) while also displaying virtual objects (i.e., objects such as a digital human model (DHM) and/or VSMs, wherein the VSMs correspond to RW objects in the user's field of view). Thus, the display 24 facilitates so-called augmented reality (AR). In the illustrated examples shown in FIGS. 2-3, the display 24 comprises an electronic display circuit 50 and two transparent lenses 52, 54, wherein each lens comprises a respective surface (56, 58) upon which the electronic display circuit 50 may project virtual objects so that the user-when wearing the wearable device 12—perceives the virtual objects as if they are overlaying or immersed with the RW objects in his/her respective field of view (FOV).

Wired and/or wireless communication device 26 may comprise any suitable electronic hardware configured to send and receive wireless messages between the wearable device 12 and at least the remote computer 16. In some examples, the wired and/or wireless communication device 26 further may communicate with auxiliary device 14 as well. According to one non-limiting example, wired and/or wireless communication device 26 comprises a short-range wireless communication (SRWC) chipset (not shown) that enables the wired and/or wireless communication device 26 to communicate via a Wi-Fi or Wi-Fi Direct protocol, a Bluetooth or Bluetooth Low Energy (BLE) protocol, or other suitable SRWC protocol. Alternatively, or in addition thereto, wired and/or wireless communication device 26 may comprise a port 60 (e.g., a USB or other suitable port) for receiving a wire harness 62 that connects to remote computer 16 so that ergonomic data pertaining to an assessment may be downloaded from computer 30 to remote computer 16 for further ergonomic analysis.

Computer 30 may be coupled to sensor(s) 22, display 24, and communication device 26 (e.g., controlling the operation thereof, processing data received therefrom, or providing output data thereto). As discussed above, computer 30 may comprise the one or more processors 32 (only one is shown for purposes of illustration) and the memory 34. Processor(s) 32 may be programmed to process and/or execute digital instructions to carry out at least some of the instructions described herein. Non-limiting examples of processor(s) 32 include a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 32 read from memory 34 and execute one or more sets of instructions (e.g., computer programs) which may be embodied as a computer program product stored on a non-transitory computer-readable storage medium (e.g., such as memory 34). Non-limiting examples of instructions will be described below in the processes illustrated using flow diagrams, wherein these and other instructions may be executed in any suitable sequence unless otherwise stated. These instructions and the example processes described below are merely embodiments and are not intended to be limiting.

Memory 34 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 34 may store one or more sets of instructions which may be embodied as software, firmware, or other programming instructions executable by the processor(s) 32—including but not limited to the instruction examples set forth herein. In operation, processor(s) 32 may read data from and/or write data to memory 34.

As will be explained in detail in the process(es) below, computer 30 may be programmed to execute instructions to carry out a real-time ergonomic assessment by capturing sensor data (e.g., including depth data) of the user's surroundings (e.g., when the user is wearing the wearable device 12), determining—based on a real-world (RW) object—a virtual surface model (VSM) using the depth data, displaying a digital human model (DHM) (and sometimes the VSM) in augmented reality to the user using the display 24, permitting the user to articulate a position, orientation, and posture of the DHM relative to at least one VSM, and permitting the user to define force parameters (e.g., associated with the RW object), and then assessing the ergonomic impact to the DHM when the DHM interacts with the VSM.

Before proceeding to describe other elements of system 10, it should be appreciated that the illustrated wearable structure 20 is merely one example and that other implementations exist. For example, the wearable structure 20 may comprise goggles, headphones, a helmet, a mask, or the like. Accordingly, the arrangement of the display 24 and/or sensor(s) 22 may differ, depending on the configuration and arrangement of the wearable structure 20. Further, display 24 may or may not utilize the illustrated lenses 52, 54. For instance, in at least one example, a lens of the display 24 could comprise a face shield or the like. Thus, the term wearable structure 20 should be construed broadly to include these examples and their respective equivalents.

Returning to FIG. 1, the optional auxiliary device 14 may be any electro-mechanical device which is configured to operate with wearable device 12 (e.g., to further facilitate user control by wearable device 12). Device 14 may have one or more sensors 64 (which detect user gestures or user selections) and a wireless communication device 66 (e.g., which may be similar to device 26 and) which enable auxiliary device 14 to serve as an input device to wearable device 12. A non-limiting example of such the auxiliary device 14 is a glove having tracking sensors that is in wireless communication with wearable device 12. Other examples of auxiliary devices 14 are also contemplated. In implementations of system 10 that do not include auxiliary device 14, hand and arm gestures may be detected by sensors 22 as user commands and serve as input to wearable device 12.

Remote computer 16 may be a workstation or laptop computing device. For example, the remote computer 16 may have hardware that is identical to the hardware of computer 30 (i.e., it may have one or more processors, memory, etc.); therefore, its respective hardware will not be re-explained in detail. That said, remote computer 16 may execute a unique set of instructions which are stored in its memory. For example, remote computer 16 may utilize a unique operating system and execute one or more ergonomic software programs which are not installed on wearable device 12. Namely, remote computer 16 may have greater computational capability and enable the user—once he/she is finished with an ergonomic assessment in a lab or test environment—to return to his/her desk, download the data from the wearable device 12 (if not already done so), and then execute additional analytical software tools to further perform his/her job duties.

Before describing an example process which is executable by the computer 30 of wearable device 12, an example of an augmented reality (AR) environment 68 will be described illustrating an example digital human model (DHM) 70 defined by an exterior surface 71, an example of a couple of real-world (RW) objects 72, 74, a couple of examples of virtual surface models (VSMs) 76, 78 (which correspond to the RW objects 72, 74), and a virtual mesh 80 (described in detail below) which is used by computer 30 to define the VSMs 76-78 (see FIGS. 4-7 generally). As discussed above, an AR environment refers a user of the wearable device 12 perceiving at least one virtual object (e.g., the DHM 70) among one or more RW objects. As discussed below, the user optionally further may perceive the VSMs 76-78.

Figure 4:
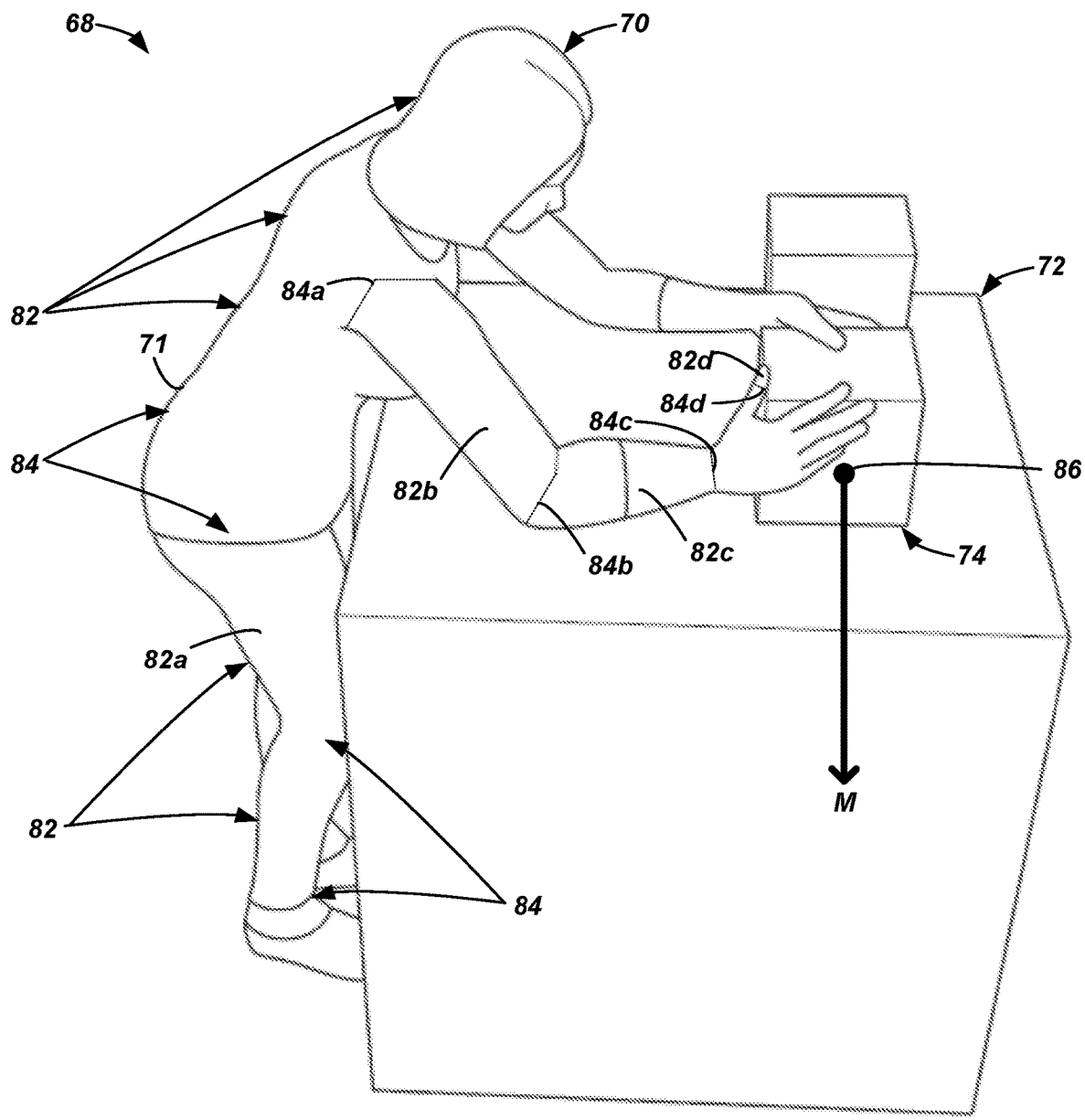
FIG. 4 illustrates a digital human model (DHM) appearing to interact with a real-world (RW) object in augmented reality (AR), as viewed by a user of the primary wearable device.

FIG. 4 illustrates AR from the point-of-view of the user; i.e., the user is wearing the wearable device 12. Thus, the user may perceive RW and virtual objects concurrently (here, the VSMs 76, 78 are hidden from view). More specifically, for example, the user (via the wearable device 12) may perceive the DHM 70, RW object 72 (a table), and RW 74 (a box) which is being grasped by the DHM 70. Further, as explained more below, the user (via wearable device 12) may have positioned, oriented, and/or postured the DHM 70 as shown—e.g., as the DHM 70 is a virtual object. For example, the user may articulate the position, orientation, and posture of the DHM 70 by moving its body segments 82 and/or body joints 84 (wherein only a few body segments 82 and body joints 84 are indicated by way of non-limiting example). In the present context and as referred to herein: position means a location in a three-dimensional (3D) RW environment, orientation refers to which direction the DHM 70 faces in the RW environment, and posture refers to the location and orientation of body segments 82 which may be articulated in accordance with the body joints 84. As used herein, a body segment refers to a rigid portion of the DHM and corresponds with a portion of a human body without a joint. As used herein, a body joint refers to portions of the DHM that link the body segments together and pivot, rotate, or flex as would a human being (i.e., with the limitations thereof). Thus, body segments and body joints, as used herein, refer to the virtual elements, and as used herein, 'physical body segments' and 'physical body joints' refer to the portions of the human body which correspond with the virtual elements of the DHM. FIG. 4 illustrates a few specific body segments (82a, 82b, 82c, 82d) and body joints (84a, 84b, 84c, 84d)—for purposes of illustration only. And it should be appreciated that the illustrated DHM 70 is merely an example; computer 30 may store other DHMs as well (which may be perceived by the user via display 24), wherein any of the DHMs may be characterized by gender (male or female), by weight (a predetermined percentile weight), by height (a predetermined percentile height), and/or by any other suitable characteristic.

As described more below, using the wearable device 12 (and/or also the auxiliary device 14) the user may, among other things: position the DHM 70 near the RW object 72; posture the DHM 70 by moving, among others, body segments 82a-82d and body joints 84a-84d; and assign force parameters to a location on the DHM 70, wherein the force parameters are associated with the VSMs (e.g., based on the characteristics of the corresponding RW objects). As used herein, force parameters refer to a force magnitude, a force direction, and a force location (that is, where in 3-space a force vector (i.e., the force's magnitude and direction) are to be applied). To illustrate force parameters, consider VSM 78 (hidden in FIG. 4, but which corresponds with RW object 74). Using the wearable device 12, the user may model at least one force location (on the DHM 70) as a point mass 86 (e.g., as a single point) having a magnitude M and a direction (downwardly, as indicated by the arrow and due to gravity).

Figure 5:
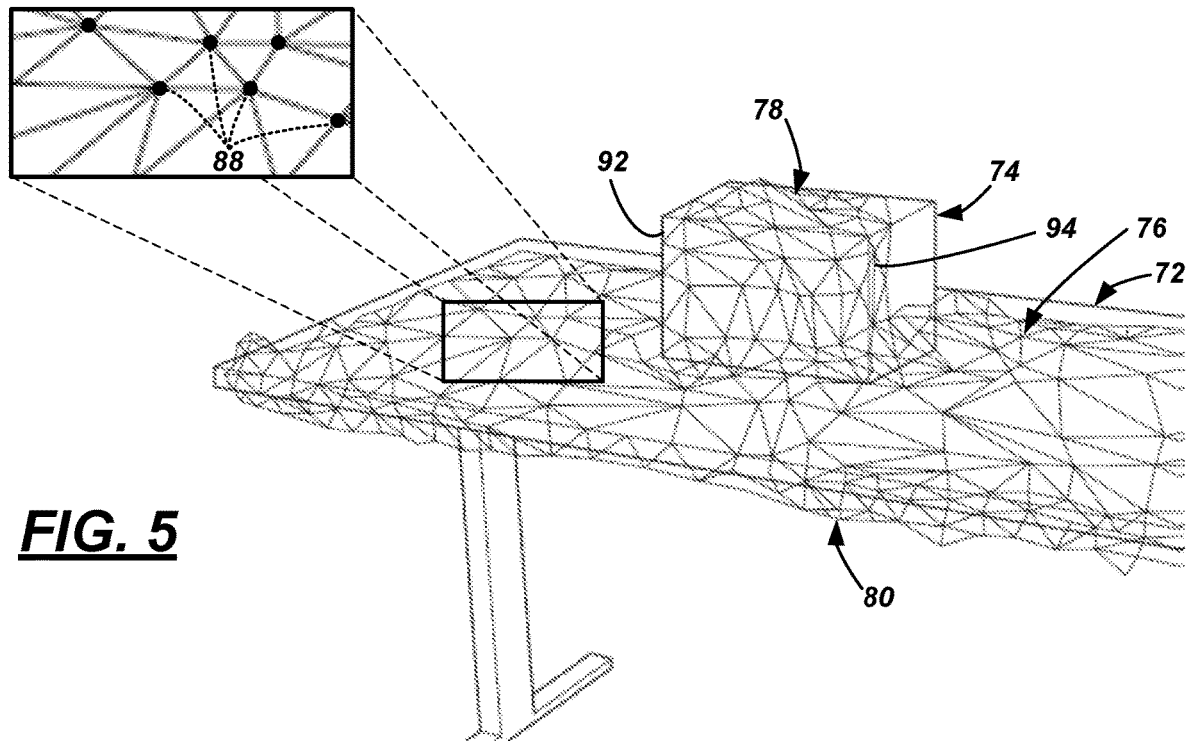
FIG. 5 illustrates an AR user experience (UE) as viewed by the user of the primary wearable device, illustrating, among other things, the RW object, a virtual mesh, and a virtual surface model (VSM) that corresponds with the RW object.

FIG. 5 illustrates the RW objects 72, 74, the VSMs 76, 78, and the virtual mesh 80. As briefly discussed above, the virtual mesh 80 may be derived using points (sensed depth data) of a point cloud; a few of a plurality of points 88 are illustrated in the enlarged region of FIG. 5. Thus, the virtual mesh 80 is a shrink wrap of any/all RW objects from the point of view of the user. Once the s computer 30 generates the virtual mesh 80, computer 30 may determine intersections of these points 88 which define the surface(s) of the VSMs 76, 78—the surfaces of the VSMs 76, 78 corresponding to actual surfaces of RW objects 72, 74, respectively. Thus, the virtual mesh 80 may be used to define virtual objects (such as VSM 76 and VSM 78). Further, as discussed more below, the virtual mesh 80 may serve as a surface by which the exterior surface 71 of DHM 70 may connect (virtually) to the VSMs and further may limit the positioning, orientation, and posturing of the DHM 70 with respect to its virtual environment (e.g., so that the exterior surface 71 of DHM 70 may be adjacent VSMs, but does not occupy the volume thereof (e.g., is not modeled to occupy the same space as RW objects)).

Figure 6:
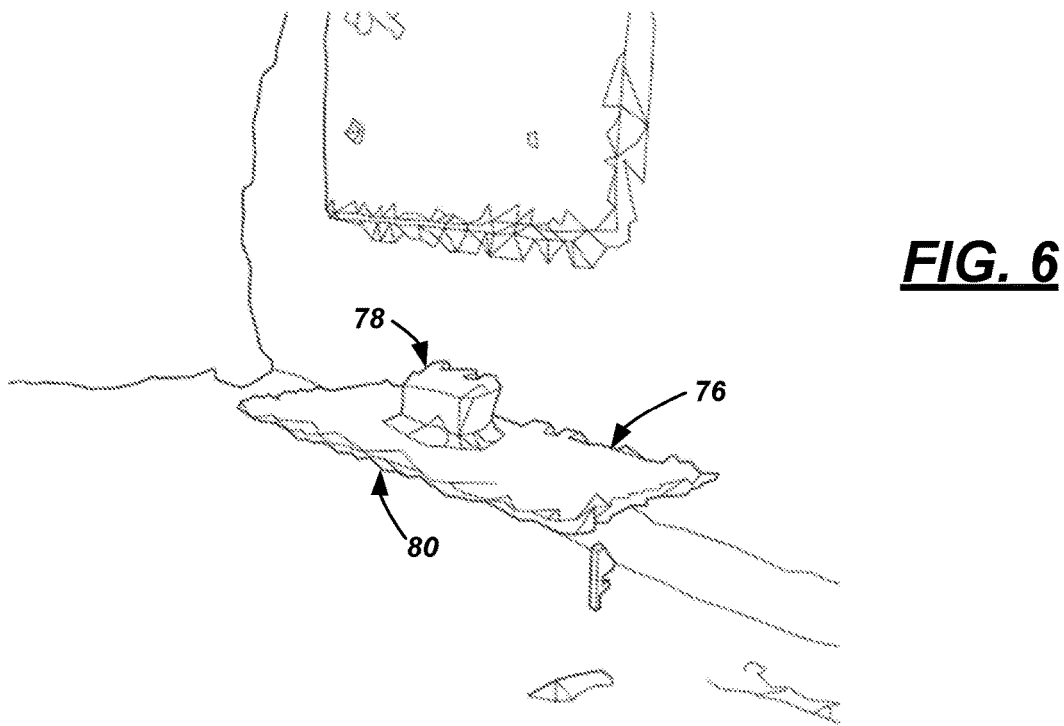
FIG. 6 illustrates multiple VSMs as viewed by the user of the primary wearable device, wherein the RW objects are hidden for illustrative purposes only.

FIG. 6 illustrates the virtual mesh 80 and a number of virtual objects as viewed by the user of the primary wearable device. In FIG. 6, the RW objects 72, 74 are hidden for illustrative purposes only.

Figure 7:
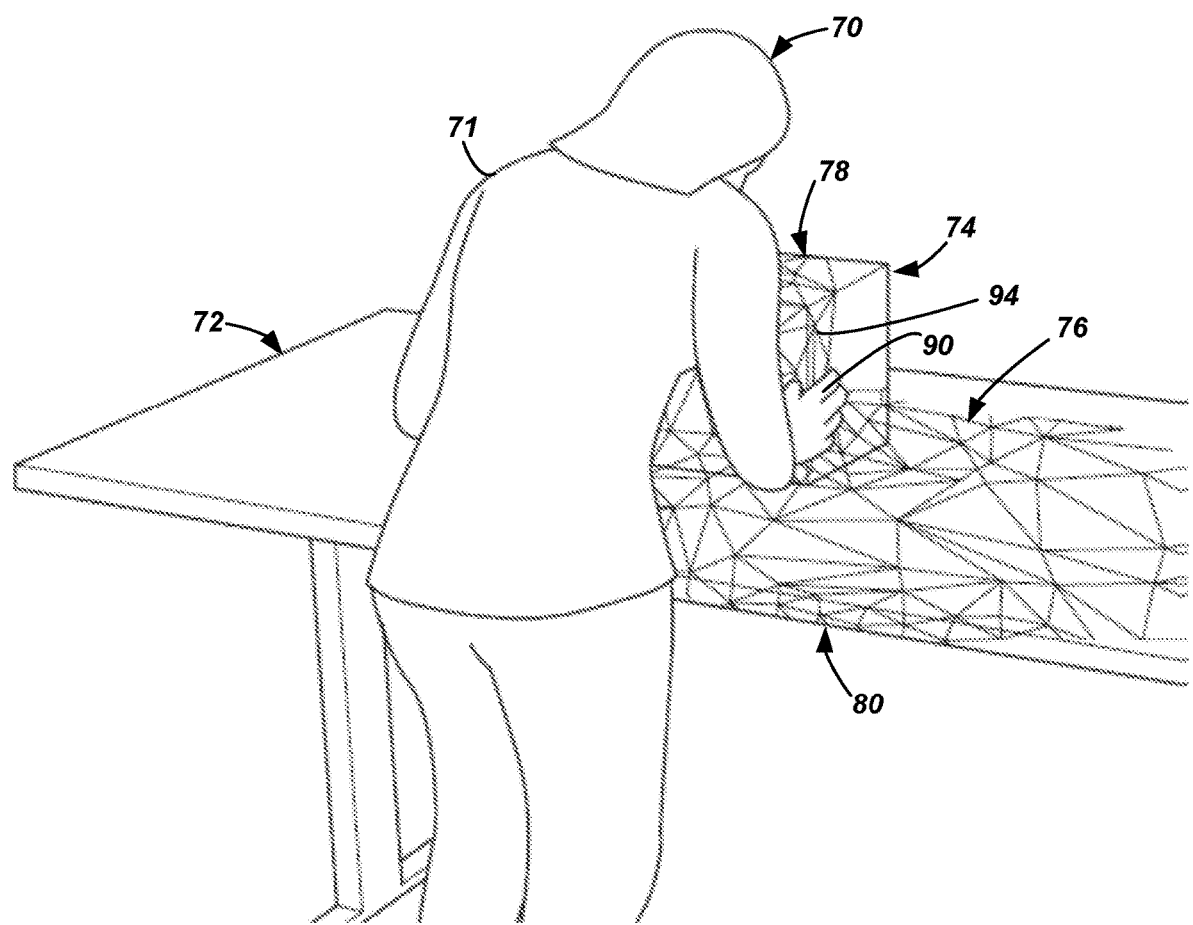
FIG. 7 illustrates, from the point-of-view of the user of the primary wearable device, the DHM, the RW object, and the corresponding VSM, wherein the DHM is snapped to the VSM to model the DHM's interaction with the RW object.

FIG. 7 illustrates an example of AR, as viewed by the user of the wearable device 12—e.g., namely, viewing RW object 72, RW object 74, and the DHM 70. In some examples, the virtual mesh 80 (and consequently VSMs 76, 78) may be toggled ON or OFF via the wearable device 12. Thus, while FIG. 7 illustrates that the user perceives the virtual mesh 80 and the VSMs 76, 78, this is merely an example. As will be explained more below, FIG. 7 also shows the DHM 70 snapped to VSM 78. As used herein, the term snap (snapped, snapping, etc.) refers to connecting a portion of the DHM 70 to the respective VSM so that ergonomic data may be obtained based on force parameters associated with the VSM acting upon the DHM 70 (e.g., in a RW environment, snapping would be akin to a human grasping or holding a RW object). FIG. 7 illustrates the hands 90 of the DHM 70 snapped to VSM 78; however, this is merely an example.

Turning now to FIGS. 8-9, a flow diagram is illustrated showing a process 800 of determining an ergonomic assessment using at least the wearable device 12. As will be described more below, by using the wearable device 12, ergonomic assessment efficiency may be improved—as the user need not make multiple trips back and forth between his/her workstation and a lab (or mockup) environment. For purposes of illustration only (and not intending to be limiting), the process 800 will refer to the AR environment shown in FIGS. 4-7.

Process 800 begins with block 805, wherein a user may be wearing the wearable device 12 on his/her face or head. In block 805, the computer 30 may receive, via sensor(s) 22, sensor data from the RW environment while the user may perceive the RW environment through, e.g., the transparent lenses 52, 54 of the wearable device 12. According to at least one example, the sensor data comprises depth data in the form of point cloud data (such as that shown in FIG. 5); however, this is merely an example. In other examples, the sensor data received may include camera data, other depth data, and/or the like. Thus, in block 805, computer 30 may capture sensor data regarding, among other things, the table and box (RW objects 72, 74).

In block 810 which follows, computer 30 may use the sensor data to generate virtual mesh 80. For example, computer 30 may use points 88 of a point cloud to define surfaces of RW objects 72, 74. Accordingly, using the surfaces and/or other object identification techniques, RW objects 72, 74 may be identified and defined as VSMs 76, 78, respectively. Determining a VSM serves two purposes: it enables the user to model a RW object (e.g., giving the VSM the size, shape, mass, density, etc. that corresponds to a RW object), and it enables the user to determine the effects of a RW object on a human (e.g., by modeling the DHM 70 (a virtual object) interacting the corresponding VSM (another virtual object)).

In block 815 which follows, computer 30 may provide, via the display 24, augmented reality (AR) by generating and/or displaying the digital human model (DHM) 70 so that the user perceives the DHM 70 within the RW environment viewed through the lenses 52, 54, wherein the DHM and the VSM are restricted from occupying a common three-dimensional space (in this context, the term 'common' means shared by more than one). For example, the DHM 70 may be bounded so that the DHM 70 does not occupy space already occupied by RW objects (e.g., such as RW objects 72, 74) and/or corresponding VSMs 76, 78. The boundaries may be defined by the virtual mesh 80 and the exterior surface 71 of DHM 70 (which may be located adjacent one another but not pass through one another). Accordingly, even after the DHM 70 is displayed, the sensor(s) 22 may continue to receive and process sensor data so that the DHM 70 abides in the three-dimensional space without interfering with RW objects. This assists the user of the wearable device 12, as the user is free to move about the RW environment (and the DHM 70). Additionally, in block 815, the user may determine whether to permit VSMs 76, 78 to be viewable via display 24. For example, the user may toggle ON or OFF one or more portions of the virtual mesh 80 so that he/she can see a digital representation of the VSMs 76, 78 or not—e.g., in the instant example, this may assist the user in temporarily visualizing the respective VSMs 76, 78 to ensure that they have been captured accurately and that they appropriately represent the surfaces of RW objects 72, 74.

Following block 815, process 800 may proceed to block 820. In block 820, the user may command (CMD) the wearable device 12 to perform an operation. Input commands (CMDs) issued by the user may be performed in any suitable manner. According to at least one example, computer 30 may provide, via display 24, a virtual interactive user interface while concurrently using sensor(s) 22 to gather sensor data from the user's hands and/or from the auxiliary device 14 (e.g., using sensors 64 or the like). For example, by using hand gestures or user hand movements relative to the virtual interactive user interface or the like, the user may issue a variety of commands to the wearable device 12. In block 820, computer 30 may determine whether the user's command is to position, orient, and/or posture the DHM 70. If it is, then process 800 proceeds to block 825. Else, in at least one example, the process 800 may loop back and repeat block 820—waiting for the user to issue a command to position, orient, and/or posture the DHM 70.

In block 825, having received the command in block 820, the computer 30 may respond by positioning, orienting, and/or posturing the DHM 70 as instructed. In at least some examples, the user's hand movements may be used to do the positioning, orienting, and/or posturing; however, other techniques may be employed as well or instead.

In block 830 which follows, computer 30 may determine whether the user issued a command to snap the DHM 70 to a VSM (e.g., VSM 78). When the user commands snapping a portion of the DHM 70 to the VSM 78, then process 800 may proceed to block 835. And when the user has not issued such a command, the process may either loop back to block 820 or loop back and wait for the user to issue a snap command.

In block 835 which may follow block 830, the computer 30 (in response to the command) moves at least one body segment 82 and/or moves at least one body joint 84 of DHM 70 in order snap a portion of DHM 70 to the VSM 78. In the illustrations, the hands 90 of DHM 70 are snapped to side surfaces 92, 94 of VSM 78 (see FIGS. 5, 7). It should be appreciated that snapping hands 90 to VSM 78 may include moving a plurality of body segments (including but not limited to segments 82b, 82c, 82d, etc.) and moving a plurality of body joints (including but not limited to joints 84b, 84c, 84d, etc.). Further, in some examples, the front of the DHM's hips may be braced against an edge of VSM 80 (corresponding to the table 72).

Block 840 may follow. In block 840, computer 30 may determine whether the user issued a command to apply force parameters to a location on the DHM—e.g., assigning a force magnitude, a force direction, and a force location to DHM 70. When the user commands to apply force parameters to the location on the DHM, then process 800 may proceed to block 845. And when the user has not issued such a command, the process may either loop back to blocks 820 or 830 or loop back to block 840 and wait for the user to issue such a command.

In block 845 which may follow block 840, the computer 30 (in response to the command) apply force parameters to DHM 70 that are associated with VSM 78. For example, the computer 30 may assign to the hands of DHM 70 a force magnitude (e.g., M), a force direction (e.g., downwardly), and a force location (e.g., at point mass 86).

It should be appreciated that from the point-of-view of the user (via display 24), the computer 30 may appear to assign force parameters to the corresponding RW object (e.g., RW object 74), as shown in FIG. 4. This may be especially true when the VSM 78 is hidden from view (e.g., toggled OFF) as it is in FIG. 4.

It should further be appreciated that when the DHM 70 is snapped to the VSM 78 (which now is associated with the selected force parameters), a modeled, bio-mechanical load may be acting on the DHM 70 (see block 850 (FIG. 9) which follows block 845). In block 850, the computer 30 may calculate one or more ergonomic measurements using the DHM 70 and VSM 78 (e.g., wherein the hands 90 are snapped to VSM 78)—e.g., determining ergonomic measurements on the joints of the back, shoulders, elbows, wrists, etc. of DHM 70. Of course, these ergonomic measurements will vary depending on the posture of the DHM 70.

Ergonomists, such as the user of wearable device 12, may desire to assess human body stress by observing the modeled stress on the DHM 70. Thus, block 855 may follow. In block 855, computer 30 may determine whether the user issued a command to obtain one or more ergonomic measurements. When the user commands to obtain one or more ergonomic measurements, then process 800 may proceed to block 860. And when the user has not issued such a command, the process may either loop back to blocks 820, 830 or 840 or loop back to block 855 and wait for the user to issue such a command.

In block 860 which may follow, the computer 30 may provide to the user, via display 24, an augmented reality (AR) representation of an ergonomic assessment. For example, the assessment may comprise the requested ergonomic measurements of block 855 (and/or additional measurements). Further, the ergonomic measurements may be associated with the respective relevant body segments 82 and/or body joints 84 of DHM 70. According to one example, the displayed ergonomic measurements (in AR) may overlay the relevant body segments and/or joints 82, 84 of DHM 70. According to another example, the displayed ergonomic measurements may have lead lines (or the like) pointing to the relevant body segments and/or joints 82, 84 of DHM 70.

Following block 860, the process 800 may end. Alternatively, process 800 could loop back to one or more of blocks 820, 830, 840, or 855 so that the user may make additional ergonomic assessments.

Other examples of process 800 also exist. For example, unless otherwise noted, the instructional blocks may occur in a different order. Further, additional blocks are contemplated. For example, in at least one example, ergonomic data is provided to remote computer 16—e.g., by wire download or wireless transmission. In the latter instance, transmitting wireless data may occur while the user continues to use the wearable device 12—thereby making available memory space (in memory 34). In this context, ergonomic data includes data regarding at least the posture of the DHM 70, data regarding the VSM (e.g., size, shape, and/or force parameters thereof), and data regarding the snap (e.g., information regarding what body segments 82 and/or body joints 84 are used and where they attach to the respective VSM).

Thus, there has been described an ergonomic assessment system that includes a wearable device that facilitates an augmented reality user experience (UE). The wearable device comprises a computer that is programmed to insert a digital human model (DHM) into a real-world environment and permit the user (typically an ergonomist) to view and manipulate the DHM so that it can interact with virtual objects (of its corresponding real-world environment) so that ergonomic data may be determined and provided to the user. In this manner, the user may be able to assess various ergonomic use-cases without the need to digitally model the entire scenario (typically by physically measuring the spatial arrangement of items in the real word environment and recreating digital versions of these items with the same spatial relationship in a virtual environment with a DHM). Accordingly, the present system improves user efficiency.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to a real-world environment with which a digital human model may interact.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A wearable device, comprising:
a display that permits a user to view a real-world environment; and
a computer in communication with the display, the computer comprising one or more processors and memory storing instructions, executable by the one or more processors, the instructions comprising instructions to:
using sensor data, determine a virtual surface model associated with a real-world object in the real-world environment;
provide, via the display, a three-dimensional digital human model located within the real-world environment;
move the digital human model relative to the virtual surface model, wherein the digital human model and the virtual surface model are restricted from occupying a common three-dimensional space;
identify force parameters associated with the virtual surface model;
apply the force parameters to the digital human model; and
calculate an ergonomic measurement based on the force parameters.

2. The wearable device of claim 1, wherein the instructions further comprise instructions to:
generate a virtual mesh using the sensor data; and
determine the virtual surface model based on the virtual mesh.

3. The wearable device of claim 1, wherein the instructions further comprise instructions to:
determine a virtual mesh using the sensor data; and
restrict an exterior surface of the digital human model from occupying a space defined by the real-world object.

4. The wearable device of claim 1, wherein the sensor data comprises point cloud data, wherein the virtual surface model is determined using the point cloud data.

5. The wearable device of claim 1, wherein the instructions further comprise instructions to:
based on a user command, position, orient, or posture at least one body segment or at least one body joint of the digital human model.

6. The wearable device of claim 1, wherein the instructions further comprise instructions to:
snap the digital human model to the virtual surface model.

7. The wearable device of claim 6, wherein snapping includes connecting at least a portion of an exterior surface of the digital human model to the virtual surface model.

8. The wearable device of claim 1, wherein the force parameters comprise:
a force magnitude, a force direction, and a force location.

9. The wearable device of claim 1, wherein the instructions further comprise instructions to:
provide, via the display, one or more ergonomic measurements of the digital human model.

10. The wearable device of claim 1, further comprising:
at least one sensor that receives the sensor data; and
a wearable structure that supports the at least one sensor, the display, and the computer.

11. A method of using a wearable device, comprising:
using sensor data, determining a virtual surface model associated with a real-world object in a real-world environment;
providing, via a display of the wearable device, a three-dimensional digital human model located within the real-world environment, wherein the display permits a user to view the real-world environment and the digital human model concurrently, wherein the digital human model and the virtual surface model are restricted from occupying a common three-dimensional space;
identifying force parameters associated with the virtual surface model;
applying the force parameters to the digital human model; and
calculating an ergonomic measurement based on the force parameters.

12. The method of claim 11, further comprising:
generating a virtual mesh using the sensor data.

13. The method of claim 12, further comprising:
determining the virtual surface model based on the virtual mesh.

14. The method of claim 11, further comprising:
determining a virtual mesh using the sensor data; and
restricting an exterior surface of the digital human model from occupying a space defined by the real-world object.

15. The method of claim 11, wherein the sensor data comprises point cloud data, wherein the virtual surface model is determined using the point cloud data.

16. The method of claim 11, further comprising:
based on a user command, positioning, orienting, or posturing at least one body segment or at least one body joint of the digital human model.

17. The method of claim 11, further comprising:
snapping the digital human model to the virtual surface model.

18. The method of claim 17, wherein the snapping includes connecting at least a portion of an exterior surface of the digital human model to the virtual surface model.

19. The method of claim 11, further comprising:
providing, via the display, one or more ergonomic measurements of the digital human model.

20. The method of claim 11, wherein the wearable device further comprises:
at least one sensor that receives the sensor data;
a computer; and
a wearable structure that supports the at least one sensor, the display, and the computer.

* * * * *